US008566214B2

(12) United States Patent
Cavanaugh et al.

(10) Patent No.: US 8,566,214 B2
(45) Date of Patent: Oct. 22, 2013

(54) METHOD, COMPUTER PROGRAM PRODUCT, AND APPARATUS FOR PROVIDING REVERSE AUCTION TRANSPORT SERVICES

(75) Inventors: Craig Cavanaugh, Atlanta, GA (US); Ben Balsley, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 821 days.

(21) Appl. No.: 11/871,856

(22) Filed: Oct. 12, 2007

(65) Prior Publication Data

US 2009/0099953 A1 Apr. 16, 2009

(51) Int. Cl.
*G06Q 40/00* (2012.01)
*G06Q 30/00* (2012.01)
*G06Q 30/08* (2012.01)
*G06Q 30/06* (2012.01)

(52) U.S. Cl.
CPC ............... *G06Q 40/00* (2013.01); *G06Q 30/08* (2013.01); *G06Q 30/0611* (2013.01)
USPC .......................... 705/37; 705/26.3; 705/26.4

(58) Field of Classification Search
CPC .... G06Q 40/00; G06Q 30/08; G06Q 30/0611
USPC ...................................... 705/5, 37, 26.3, 26.4
See application file for complete search history.

(56) References Cited

U.S. PATENT DOCUMENTS

| 7,024,376 | B1 | 4/2006 | Yuen | |
|---|---|---|---|---|
| 2001/0047284 | A1* | 11/2001 | Blalock et al. | 705/8 |
| 2004/0260581 | A1* | 12/2004 | Baranowski et al. | 705/5 |
| 2006/0059023 | A1* | 3/2006 | Mashinsky | 705/5 |
| 2006/0109964 | A1 | 5/2006 | Skelton | |

* cited by examiner

*Primary Examiner* — Ella Colbert
*Assistant Examiner* — Scott S Trotter
(74) *Attorney, Agent, or Firm* — Cantor Colburn LLP (57) ABSTRACT

A method, computer program product, and apparatus for providing reverse auction services are provided. A reverse auction request for transportation or a reverse auction request for delivery is received from a communications device. Geographical location information of an origination location and a destination location for the reverse auction request for transportation or delivery is received from the communications device. The reverse auction request for transportation or delivery is transmitted. Bids to the reverse auction request for transportation or delivery are received. The bids to the request for transportation or delivery are transmitted to the communications device.

8 Claims, 5 Drawing Sheets

200

Transportation Table

| Reverse Auction Transportation Service | | | | |
|---|---|---|---|---|
| Origination | 1200 Peachtree Street (Restaurant) | | | |
| Destination | 1000 Spring Street (Theater) | | | |
| | Approximate Arrival Time | Expense | Distance Away | Type Of Vehicle |
| (1) Best Cab | 10 minutes | $20.00 | 4 miles | Van |
| (2) Yellow Cab | 5 minutes | $10.00 | 1 mile | Car |
| (3) Limo Service | 15 minutes | $35.00 | 8 miles | Limousine |
| (4) Taxi | 3 minutes | $8.00 | 2 miles | Car |

Transportation Table

| Reverse Auction Transportation Service | | | | |
|---|---|---|---|---|
| Origination | 1200 Peachtree Street (Restaurant) | | | |
| Destination | 1000 Spring Street (Theater) | | | |
| | *Approximate Arrival Time* | *Expense* | *Distance Away* | *Type Of Vehicle* |
| (1) Best Cab | 10 minutes | $20.00 | 4 miles | Van |
| (2) Yellow Cab | 5 minutes | $10.00 | 1 mile | Car |
| (3) Limo Service | 15 minutes | $35.00 | 8 miles | Limousine |
| (4) Taxi | 3 minutes | $8.00 | 2 miles | Car |

Package Delivery Table

| Reverse Auction Delivery Service | | | |
|---|---|---|---|
| Origination | 1200 Peachtree Street, Atlanta, GA 30000 | | |
| Destination | 1000 Spring Street, Montgomery, AL 40000 | | |
| Date Package To Be Mailed | September 13, 2008 | | |
| | *Arrival* | *Expense* | *Approximate Arrival Time* |
| (1) Federal Express | 1 day | $28.00 | Afternoon |
| (2) DHL | 2 days | $20.00 | Morning |
| (3) United Parcel Service | 2 days | $15.00 | Afternoon |
| (4) United States Postal Service | 3-5 days | $8.00 | Morning |

METHOD, COMPUTER PROGRAM PRODUCT, AND APPARATUS FOR PROVIDING REVERSE AUCTION TRANSPORT SERVICES

BACKGROUND

Exemplary embodiments relate generally to reverse auction services, and more particularly, to providing reverse auction transport services.

People are always looking for ways to comparatively choose the prices for desired services. Many times, however, when services are needed, there is not an opportunity to comparatively determine what is a good price or a good service at a particular time.

It is desirable to have a system that provides comparative choices for services when people are desiring to use the services.

BRIEF SUMMARY

Exemplary embodiments include a reverse auction server for providing reverse auction services. The reverse auction server includes a processor for executing instructions of a reverse auction server and memory for storing data of the reverse auction server. The reverse auction server is configured to provide reverse auction services. The reverse auction server transmits and receives communications through a network. The reverse auction server is operatively connected to a communications device via the network. The reverse auction server is configured to receive a request for transportation or a request for delivery from the communications device. The reverse auction server is configured to receive, from the communications device, geographical location information of an origination location and a destination location for the request for transportation or delivery. The reverse auction server receives bids responding to the request for transportation or delivery, and the revere auction server transmits the bids responding to the request for transportation or delivery to the communications device via the network.

Additional exemplary embodiments include a method for providing reverse auction services. A reverse auction request for transportation or a reverse auction request for delivery is received from a communications device. Geographical location information of an origination location and a destination location for the reverse auction request for transportation or delivery is received from the communications device. The reverse auction request for transportation or delivery is transmitted. Bids to the reverse auction request for transportation or delivery are received. The bids to the request for transportation or delivery are transmitted to the communications device.

Further exemplary embodiments include a computer program product, tangibly embodied on a computer readable medium, for providing reverse auction services. The computer program product includes instructions for causing a computer to execute the above method.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
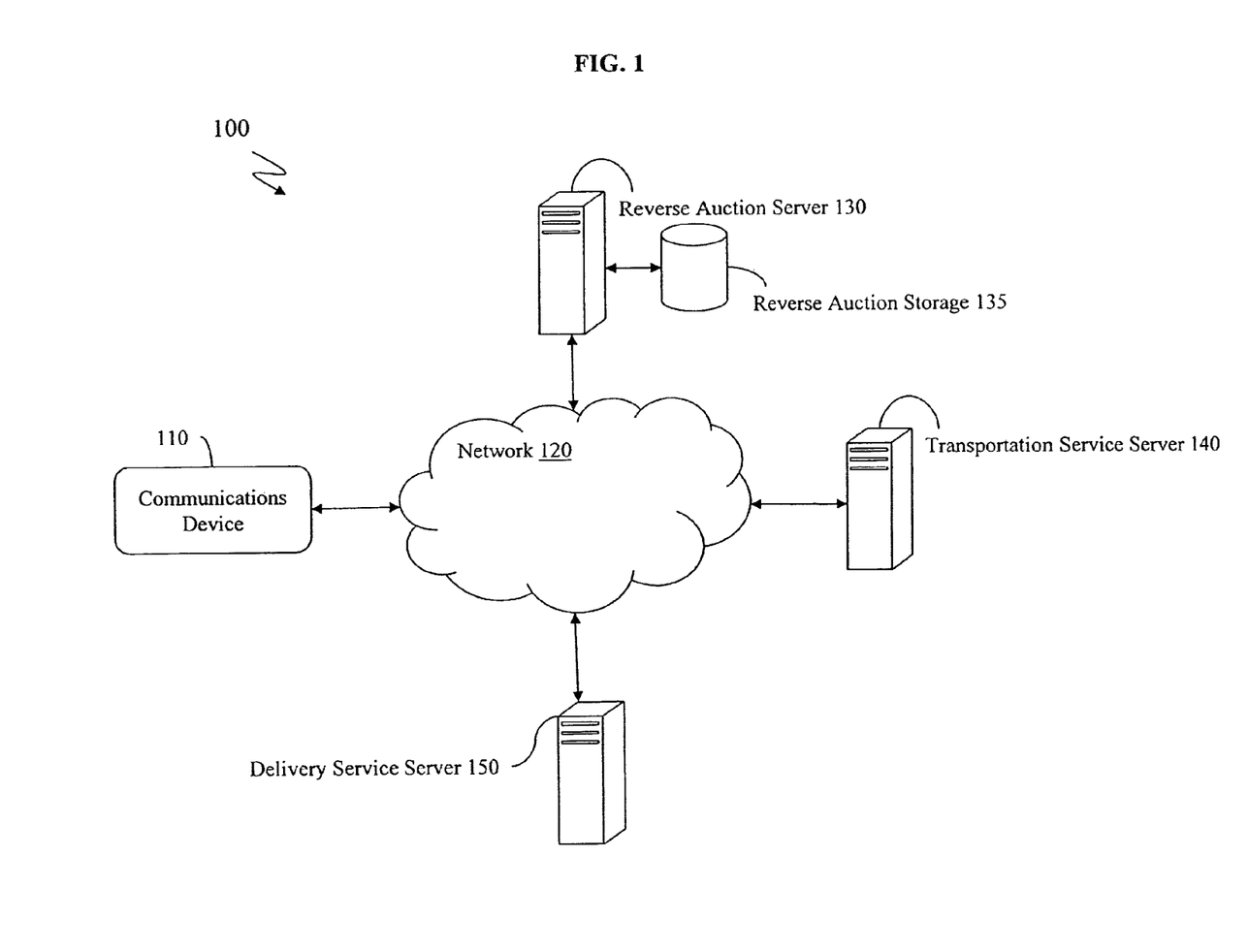
FIG. 1 illustrates a block diagram of a system in which a reverse auction service may be implemented in accordance with exemplary embodiments.

FIG. 1 illustrates a block diagram of a system 100 in which a reverse auction service may be implemented in accordance with exemplary embodiments. System 100 may provide an infrastructure through which users can access and enjoy the reverse auction service through one or more communications devices, such as communications device 110. The communications device 110 may be operatively connected to a reverse auction server 130 that is configured to provide reverse auction services via a network 120. It is understood that in exemplary embodiments and implementations, the communications device 110 can be a variety of other communications devices, such as general purpose or laptop computers, wireless devices such as cellular telephones, portable computing device, digital music players (e.g., MP3 players), and mobile devices. In addition, a wireline public switched telephone network (PSTN) telephone, Session Initiation Protocol (SIP) telephone, dual-mode mobile telephone, personal digital assistant (PDA), or other type of communications device may be included in the system 100 of FIG. 1.

The system 100 can manage multiple accounts and subscriptions as established by particular users of the reverse auction service. These accounts may then be used to provide access to the reverse auction service as described further herein.

The network 120 may include circuit-switched and/or packet-switched technologies and devices, such as routers, switches, hubs, gateways (e.g., residential gateways, including a DSL or cable modem), or IP multimedia subsystem (IMS)-based networks for facilitating communications between the communications device 110 and the reverse auction server 130. The network 120 may include wireline and/or wireless components utilizing, e.g., IEEE 802.11 standards for providing over-the-air transmissions of communications. The network 120 can be an IP-based network to facilitate communication between the reverse auction server and clients using the communication device 110.

In exemplary embodiments, the network 120 can be a managed IP network administered by a service provider, which can control bandwidth and quality of service for the communications discussed herein. The network 120 may be implemented in a wireless fashion, e.g., using wireless protocols and technologies, such as WiFi, WiMax, Blutooth, etc. The network 120 can also be a packet-switched network as a local area network, wide area network, metropolitan area network, Internet network, or other similar type of network environment. The network 120 may be a cellular communications network, a fixed wireless network, a wireless local area network (LAN), a wireless wide area network (WAN), a personal area network (PAN), a virtual private network (VPN), an intranet or other suitable network system, and the network 120 includes equipment for receiving and transmitting signals such as a cell tower and mobile switching center. In exemplary embodiments, the network 120 can also be a circuit-switched network, such as a standard public switched telephone network (PSTN).

The user may invoke the reverse auction service by inputting a particular set of keystrokes, e.g., 711, on the communications device 110, by selecting reverse auction services from a pull down menu on the communications device 110, by clicking on an icon on the communications device 110, by placing a phone call, by inputting a website, etc. The user may be asked to provide authentication information, which may be authenticated by the reverse auction server 130 or by an authenticating, authorization, and accounting (AAA) server (not shown). The reverse auction server 130 may implement authentication software for restricting or controlling access to reverse auction services provided by the reverse auction server 130, or the AAA server may control access to reverse auction services. Also, the reverse auction server 130 may implement reverse auction service logic as part of a reverse auction application for operatively connecting, as non-limiting examples, the communications device 110 with various businesses to provide bids for transport services, such as transportation services or delivery services. The reverse auction server 130 may be in communication with a reverse auction storage device 135, which stores user credentials (e.g., user names, user profiles, preferences, addresses, and passwords). The reverse auction server 130 may be implemented using a high-speed processing device (e.g., a computer system) that is capable of handling high volume activities conducted by the communications device 110 and other network entities, such as servers, routers, switches, etc. Also the reverse auction server 130 includes processors and memory for functioning in accordance with exemplary embodiments.

In accordance with exemplary embodiments, user credentials and/or reverse auction service logic may also be stored on the communications device 110 and the reverse auction server 130. As such, the communications device 110 and the reverse auction server 130 may be configured to control access to reverse auction services, to control the operations and functions of the reverse auction services, and to cause various devices to interact in providing reverse auction services.

According to exemplary embodiments, the reverse auction server 130 may receive requests from the communications device 110, e.g., to establish a reverse auction services account or to access reverse auction services. As a non-limiting example, a user may desire reverse auction services for transportation, such as for a taxi. The user may provide the origination location to the reverse auction server 130. As non-limiting examples, the origination location may be geographical information of the user's current location or of the location that the user desires to be picked up from by the taxi. The origination location may be the current address of the user, and the communications device 110 may be a location device (e.g., with GPS capabilities), such that the communications device 110 can determine and relay the current location of the user to the reverse auction server 130. Also, the user may provide the destination location to the reverse auction server. As non-limiting examples, the user may desire to be dropped off at a favorite restaurant, and the user may have the address to the restaurant stored in the communications device 110. The location of the restaurant may be transmitted from the communications device 110 to the reverse auction server 130. Additionally, the user may create a user profile that is stored on a storage device, such as the reverse auction storage 135, and the user profile may be accessible by the reverse auction server 130. The user profile may include various addresses, locations, and names, which may be selected by the user as an origination location or a destination location. As non-limiting examples, the user profile may include the address for a home location, a favorite hotel in town, or a favorite restaurant. The user profile may also include phone numbers and other useful information.

In response to receiving the origination location and the destination location of the user, the reverse auction server 130 processes the information. As a non-limiting example, the information may be processed by the reverse auction application on the reverse auction server 130. The reverse auction application is capable of determining various businesses that correspond to the reverse auction request of the user.

The reverse auction server 130 may transmit the user's request for transportation service to various businesses. As non-limiting examples, the reverse auction services provider establishes agreements with various taxi businesses that provide taxi service. The taxi businesses agree to provide bids for the opportunity to pick up and drop off the user. In exemplary embodiments, the reverse auction server 130 may transmit the user's request for transportation service to a transportation service server 140, which represents various taxi businesses in FIG. 1. In response to the transportation request, the reverse auction server 130 may receive bids from various taxis businesses desiring to pick up and drop off the user at the origination and destination locations, respectively. The reverse auction server 130 transmits the bids to the request for transportation to the communications device 110 of the user. The user may select any of the taxi businesses on the communication device 110, and the selected taxis business may provide the transportation service for the user. Also, the transportation service server 140 may transmit bids directly to the communications device 110, and the user may select the desired taxi business.

Figure 2:
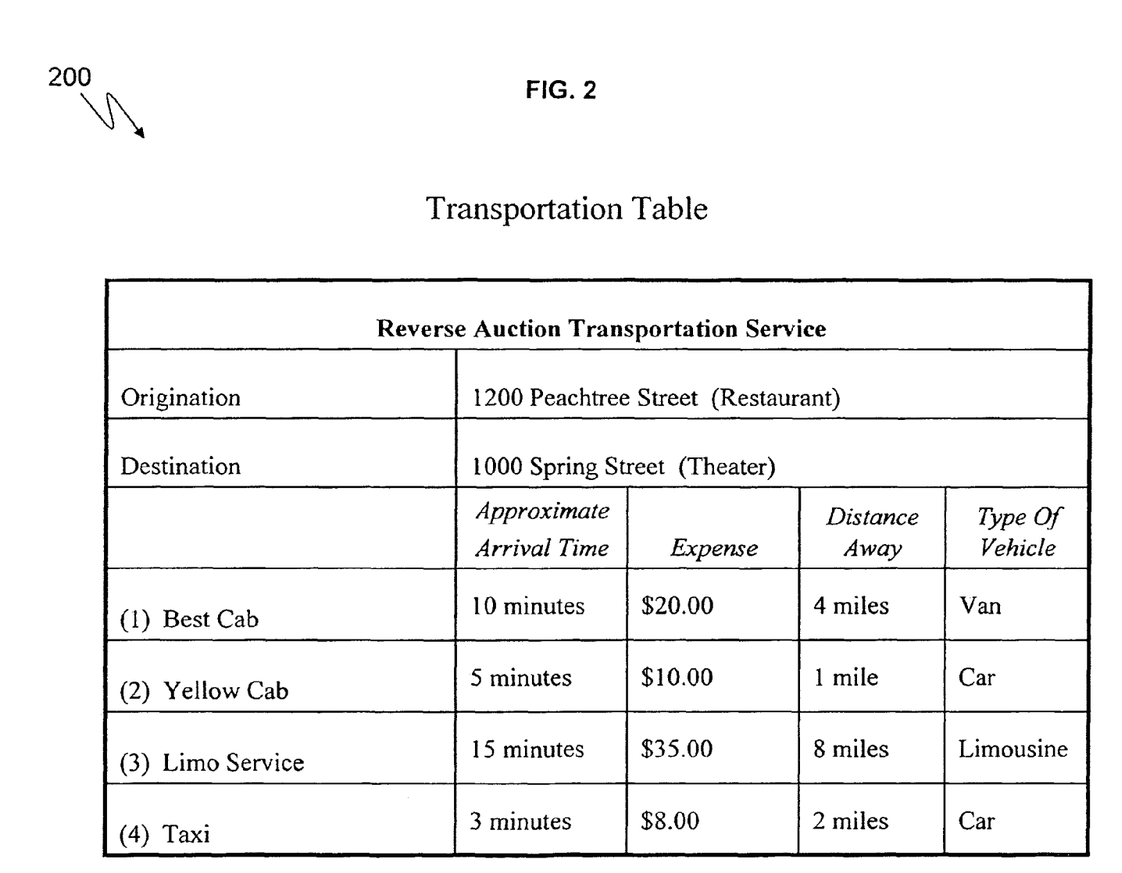
FIG. 2 illustrates a non-limiting example of a transportation table in accordance with exemplary embodiments.

In accordance with exemplary embodiments, the reverse auction application of the reverse auction server 130 may format the received bids from the various businesses so that helpful data is easily recognized, and the reverse auction server 130 may transmit the bids to the request for transportation services in a table, such as in a transportation table 200 shown in FIG. 2. It is contemplated that additional information may be provided, along with the data in the transportation table 200. The user may select the desired transportation service from the transportation table 200.

In exemplary embodiments, a user may desire reverse auction services for delivery services, such as for delivery of packages. As discussed herein, the user may input the origination location and the destination location for a package using, e.g., the communications device 110. Also, the user may select the origination and destination locations from the reverse auction server 130 or reverse auction storage 135, if the origination and destination locations have been created in the user profile. The origination location may be the address in which the package will be picked up from, such as the home of the user or a designated drop off box in the town. The destination location may be the address in which the package is to be delivered, such as an office building, a home, or a school. Also, the user may indicate the date on which the package is to be picked up or mailed, the weight of the package, whether the package is fragile, whether the package requires special care such as refrigeration, etc.

In response to receiving a request for delivery services and the origination and destination locations, the reverse auction server 130 processes the delivery services request from the user. The reverse auction service provider may establish agreements with various delivery service businesses, such as Federal Express, DHL, UPS, etc. The reverse auction server 130 transmits the request for delivery services to a delivery service server 150, which is representative of various delivery service businesses in FIG. 1. The reverse auction server 130 may receive bids the various delivery service businesses, which are all represented by the delivery service server 150 in FIG. 1 for the purposes of clarity. The bids received by the reverse auction server 130 may be processed by the reverse auction application so that a list of bids may be presented to the user. The reverse auction server 130 transmits the bids to the communications device 110 of the user. The user may select the desired delivery service business to deliver the package from the list of bids. The reverse auction server 130 may transmit the bids, e.g., in a table such as a package delivery table 300 shown in FIG. 3. The package delivery table 300 may include information that is useful to the user in making a selection. Also, the bids to the request for delivery service may be transmitted from the delivery service server 150 directly to the communications device 110 of the user.

Furthermore, the responsibilities, operations, and functions of the reverse auction service may be shared among network entities, such as among the reverse auction server 130, communications device 110, the transportation service server 140, and the delivery service server 150. Various applications may reside on the network entities to execute the reverse auction service.

Moreover, exemplary embodiments are not limited to but are capable of being implemented in the system 100 illustrated in FIG. 1. Additionally, the reverse auction server 130, the transportation service server 140, and the delivery service server 150 may be representative of numerous, varied servers. The reverse auction storage 135 may be representative of numerous, varied storages devices. Likewise, the network 120 may be representative of numerous, varied networks. Also, the communications device 110 may be representative of numerous, varied communications devices. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

FIG. 2 illustrates a non-limiting example of a transportation table in accordance with exemplary embodiments. A transportation table 200 may be generated by the reverse auction application of the reverse auction server 130, and the transportation table 200 may be transmitted to the communications device 110. The transportation table 200 contains various useful data about the bids from the various transportation businesses. The data contained in the transportation table 200 is meant to be exemplary and not limiting, and it is understood that additional data may be included in various formats in the transportation table 200.

In response to a user requesting reverse auction services for transportation service, the transportation table 200 may be generated to include the origination location (e.g., a restaurant) and the destination location (e.g., a theater). The transportation table 200 may include a list of businesses responding to the reverse auction request, the approximate time of arrival to the origination, the expense for the service, the distance away from the origination location, the type of vehicle providing the transportation, etc. As a non-limiting example, the user may prefer to ride in a limousine to the theater rather than a car or van. Accordingly, the user may use the communications device 110 to select the limo service as the means for providing transportation services.

The user profile may specify the particular type of data to include in a table, such as the transportation table 200, for presentation to the user. It is understood that more or fewer data fields of data may be included in the transportation table 200. Also, it is contemplated that the communications device 110 may generate the transportation table 200, after receiving the bids from the reverse auction server 130 or directly from the transportation service server 140.

Figure 3:
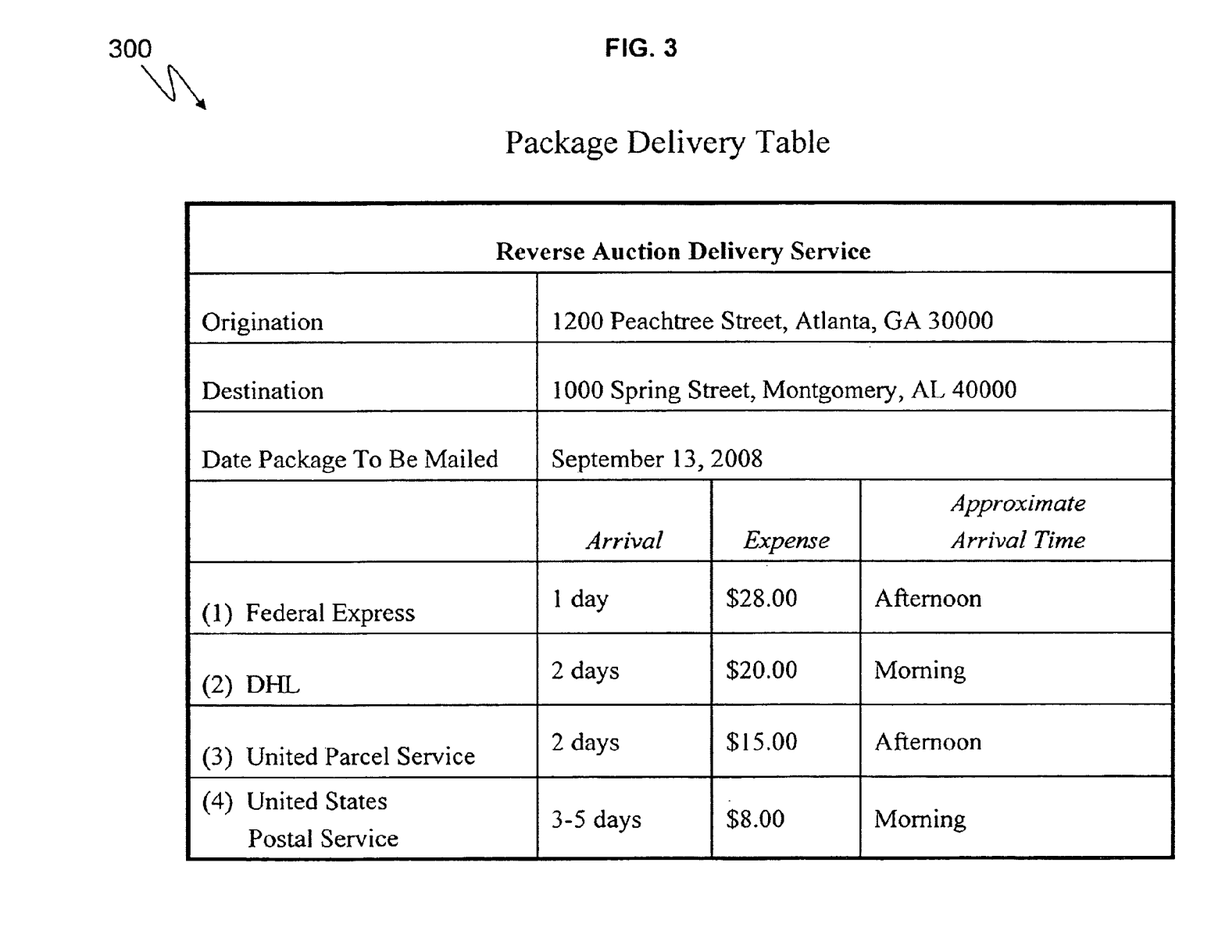
FIG. 3 illustrates a non-limiting example of a package delivery table in accordance with exemplary embodiments.

FIG. 3 illustrates a non-limiting example of a package delivery table in accordance with exemplary embodiments. A package delivery table 300 may be generated by the reverse auction application of the reverse auction server 130 or the communications device 110. The package delivery table 300 contains useful data about the bids from the various delivery service businesses.

In response to a user requesting reverse auction services for package delivery service, the package delivery table 300 may be generated to include the origination location and the destination location. The package delivery table 300 may include a list of businesses responding to the reverse auction request, the approximate length of time for arrival of the package, the expense for the service, the approximate time of day for the arrival, etc. As a non-limiting example, the user may prefer to have the package delivered as quickly as possible and not be concerned with the expense. Accordingly, the user may use the communications device 110 to select Federal Express from the package delivery table 300 as the means for providing package delivery services.

In exemplary embodiments, it is contemplated that additional data may be included in the package delivery table 300 or accessible to the user. In non-limiting examples, data provided to the user of the reverse auction service may include whether the delivery service has a drop box, whether a representative is available at a store of the delivery service business, the opening and closing hours of the store, whether the delivery service will pick the package up from the user's location, the methods of payment, etc. In exemplary embodiments, the data generated for the package delivery table 300 (or the transportation table 200) may be tailored to the preferences of the user. For example, in the user profile, the user may specify additional data fields of useful data to be included in the package delivery table 300.

Figure 4:
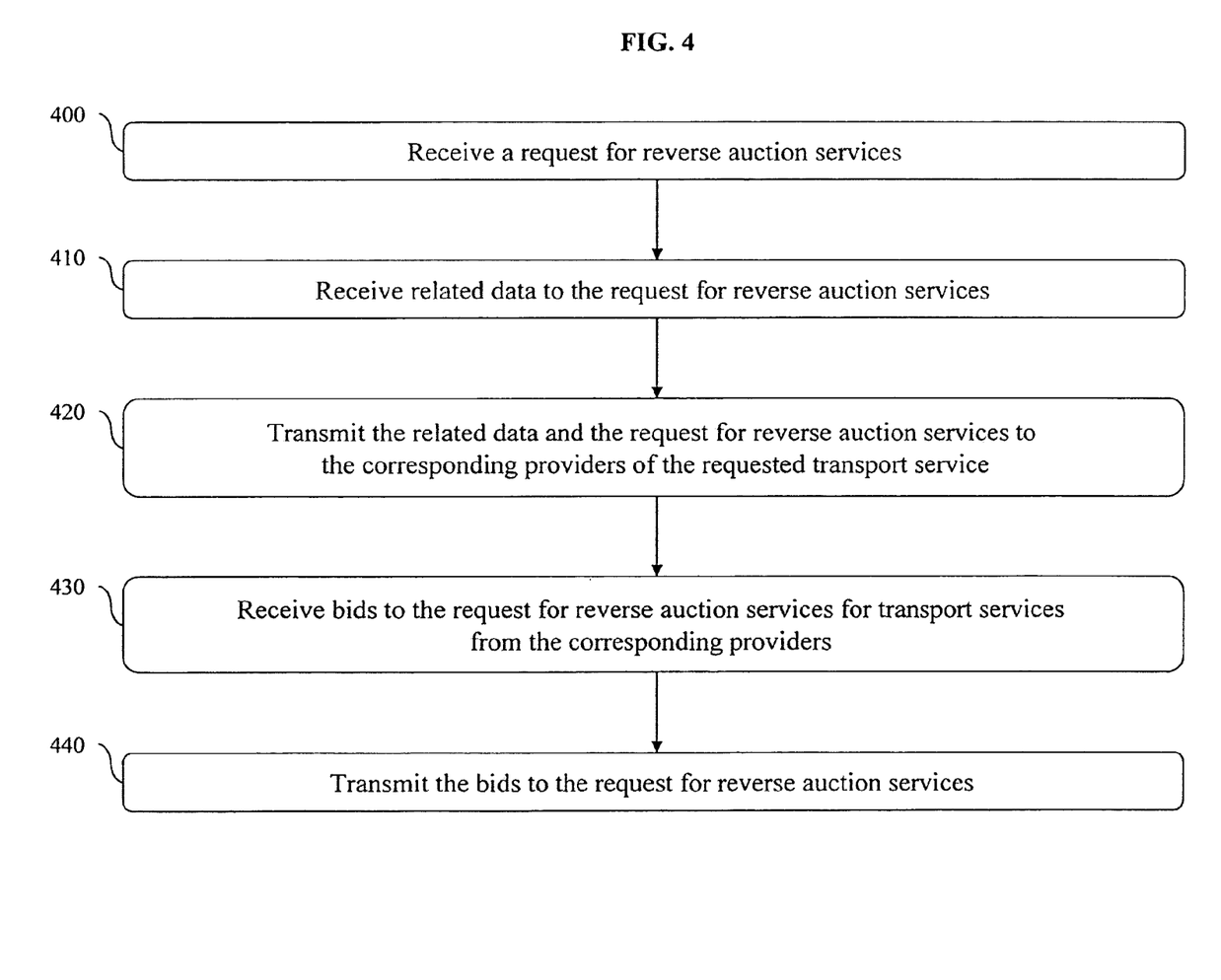
FIG. 4 illustrates a method of providing reverse auction services in accordance with exemplary embodiments.

FIG. 4 illustrates a method of providing reverse auction services in accordance with exemplary embodiments. A request for reverse auction services is received by the reverse auction server 130 at 400. Data to the request for reverse auction services is received by the reverse auction sever 130 at 410. As a non-limiting example, a user may provide an origination location and a destination location related to the request for reverse auction services. The request for reverse auction services and the associated data are transmitted to corresponding business providers (e.g., a transportation service provider or a package delivery service provider) of the requested service at 420. Bids are received from the business providers corresponding to the request for reverse auction services at 430. The bids responding to the request for reverse auction services are transmitted, e.g., to the communications device 110, at 440.

The user may select any business provider for the transport services. A payment system may be set up in which the user electronically pays for the transport service via the reverse auction service. The reverse auction service provider may have a payment system in place to receive payment from the user and relay the payment to the corresponding business, such as using E-wallet. Also, an electronic payment business may be used to provide a secure transaction environment for payment. Further, the user may pay the business provider directly before service, at the time of service, or after the service has occurred.

Figure 5:
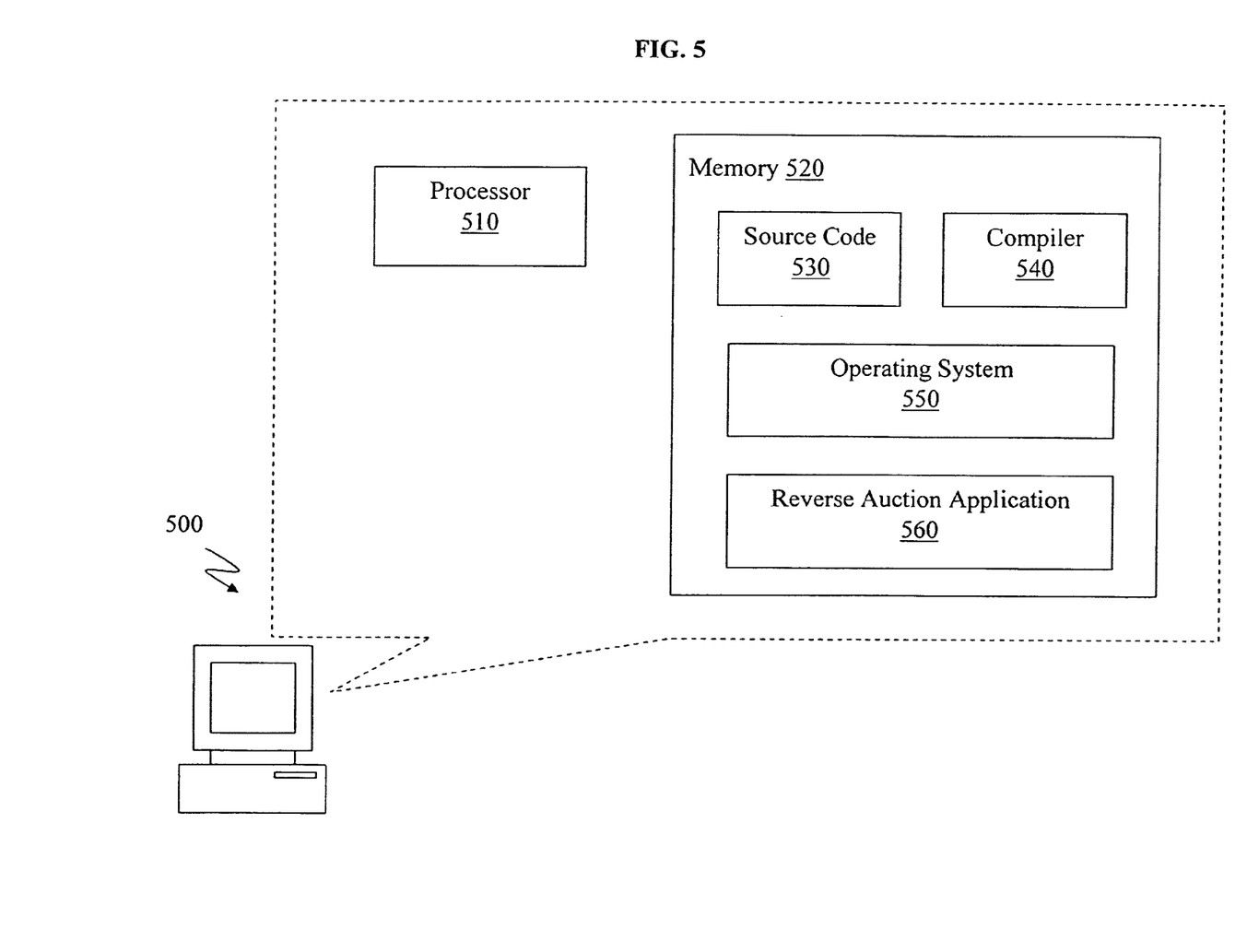
FIG. 5 illustrates an example of a computer in which exemplary embodiments may be implemented.

FIG. 5 illustrates an example of a computer in which exemplary embodiments may be implemented. The above method may also be implemented in the computer 500. The computer 500 includes, but is not limited to, PCs, workstations, laptops, PDAs, palm devices, servers (such as the reverse auction sever 130), and the like. Generally, in terms of hardware architecture, as shown in FIG. 1, the computer 500 may include a processor 510, memory 520, and one or more input and/or output (I/O) devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor. Examples of suitable commercially available microprocessors are as follows: an 80x86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 520 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in memory 520 may include one or more separate programs, each of which comprises an ordered listing of executable instructions for implementing logical functions. In the example illustrated in FIG. 1, the software in the memory 520 includes a suitable operating system (O/S) 550, compiler 540, source code 530, and the reverse auction application 560 of the exemplary embodiments. As illustrated, the reverse auction application 560 comprises numerous functional components for implementing the features and operations of the exemplary embodiments.

A non-exhaustive list of examples of suitable commercially available operating systems 550 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a Linux operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 550 essentially controls the execution of other computer programs, and provides scheduling, input-output control, file and data management, memory management, and communication control and related services. It is contemplated by the inventors that the reverse auction application 560 for implementing reverse auction services according to exemplary embodiments is applicable on all other commercially available operating systems.

The reverse auction application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the reverse auction application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices may include input devices such as, for example but not limited to, a mouse, keyboard, scanner, microphone, etc. Furthermore, the I/O devices may also include output devices, for example but not limited to, a printer, display, etc. Finally, the I/O devices may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The reverse auction application 560 and the O/S 550 are read, in whole or in part, by the processor 510, perhaps buffered within the processor 510, and then executed.

When the reverse auction application 560 is implemented in software, as is shown in FIG. 1, it should be noted that the reverse auction application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The reverse auction application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. The computer readable medium can be, for example but not limited to, an electronic, magnetic, optical, electromagnetic, infrared, or semiconductor system, apparatus, or device.

More specific examples (a nonexhaustive list) of the computer-readable medium would include the following: a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In exemplary embodiments, where the reverse auction application 560 is implemented in hardware, the reverse auction application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Although the embodiments described above are directed to transportation and delivery services, it should be appreciated that the invention is not restricted to applications for these services. Rather, the invention may be applicable for providing reverse auctioning for other services or goods.

Additionally, the elements, devices, network entities, etc. discussed herein all contain the necessary software and hardware components to function as described, which include but are not limited to processors, memory, input/output devices, buses, software applications, etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for generating a table for display with information of reverse auction services for picking up passengers, the method comprising:
   in response to receiving, from a communications device, geographical location information of an origination location of a passenger and a destination location in a request for transportation to pick up the passenger, and
   in response to receiving bids to the request for transportation to pick up the passenger,
   generating the table to transmit to the passenger on the communications device, the table generated with columns and rows for display on the communications device;
   generating an arrival time to passenger column listing individual times required for each of respective bidders to reach the passenger at the origination location for pickup in the table;
   generating a respective bidders column listing each of the respective bidders in the table;
   generating a respective distance away column for each of the respective bidders to display a distance of the respective bidders from the passenger at the origination location for pickup;
   generating the individual times for the respective bidders to reach the passenger in minutes in the arrival time to passenger column of the table transmitted to the passenger;
   in the table, visually positioning for display the individual times to reach the passenger in the arrival time to passenger column adjacent to each of the respective bidders in the respective bidders column bidding to pick up the passenger, such that each of the individual times to reach the passenger at the origination location is adjacent to names of the respective bidders desiring to pick up the passenger; and
   providing the table to allow the passenger to make selections from the table.

2. The method of claim 1, further comprising transmitting to the communications device the bids to the request for transportation to pick up the passenger; and
   receiving a response to the bids that were transmitted to the communications device.

3. The method of claim 1, wherein the request for transportation is transmitted to a plurality of transportation businesses that provide ground transportation for passengers from one location to another location for a price.

4. The method of claim 3, wherein a plurality of bids to the request for transportation are received from the plurality of transportation businesses that provide ground transportation for passengers.

5. The method of claim 1, wherein a reverse auction server provides approximate arrival times to the origination location, the approximate arrival times being a length of time for the respective bidders of the bids to arrive at the origination location to pick up the passenger.

6. The method of claim 1, further comprising generating a list of reverse auction selections as options for services corresponding to the request for transportation.

7. The method of claim 6, further comprising:
   transmitting the list of reverse auction selections to the communications device for selection; and
   receiving a response to the list of reverse auction selections from the communications device.

8. The method of claim 1, wherein the bids comprise a price for a service, and an approximate time for completing the service.

* * * * *